United States Patent [19]

Holloman

[11] 4,252,994
[45] Feb. 24, 1981

[54] AUTOMATIC TELETYPEWRITER

[75] Inventor: Charles J. Holloman, Stamford, Conn.

[73] Assignee: Trans-Lux Corporation, New York, N.Y.

[21] Appl. No.: 4,892

[22] Filed: Jan. 19, 1979

Related U.S. Application Data

[63] Continuation of Ser. No. 895,066, Apr. 10, 1978, abandoned, which is a continuation of Ser. No. 639,691, Dec. 11, 1975, abandoned.

[51] Int. Cl.³ .................. H04L 15/24; H04M 1/30
[52] U.S. Cl. .................. 178/23 R; 178/26 R; 179/90 K
[58] Field of Search ........ 179/90 BD, 90 AD, 90 CS, 179/90 K; 235/492, 494; 178/23 R, 25, 26 R, 26 A, 79, 80, 81, 3, 2 R; 340/365 R, 365 S

[56] References Cited

U.S. PATENT DOCUMENTS

| | | | |
|---|---|---|---|
| 2,353,061 | 7/1944 | Oldenboom | 235/492 |
| 3,337,686 | 8/1967 | Grant et al. | 178/23 R |
| 3,436,477 | 4/1969 | Ghiringhelli | 178/26 A |
| 3,701,856 | 10/1972 | Stuck et al. | 178/26 A |
| 3,787,639 | 1/1974 | Battrick | 179/90 K |
| 4,000,363 | 12/1976 | Widmaier | 178/26 R |

Primary Examiner—Thomas A. Robinson

[57] ABSTRACT

An automatic teletypewriter is provided. The teletypewriter includes a keyboard having alpha and numeric characters and includes means to utilize the numeric character keys for dialing into the telex network. The teletypewriter also automatically keeps count of the characters generated on each line and generates a carriage return-line feed signal at the end of each line if not directed to do so.

9 Claims, 12 Drawing Figures

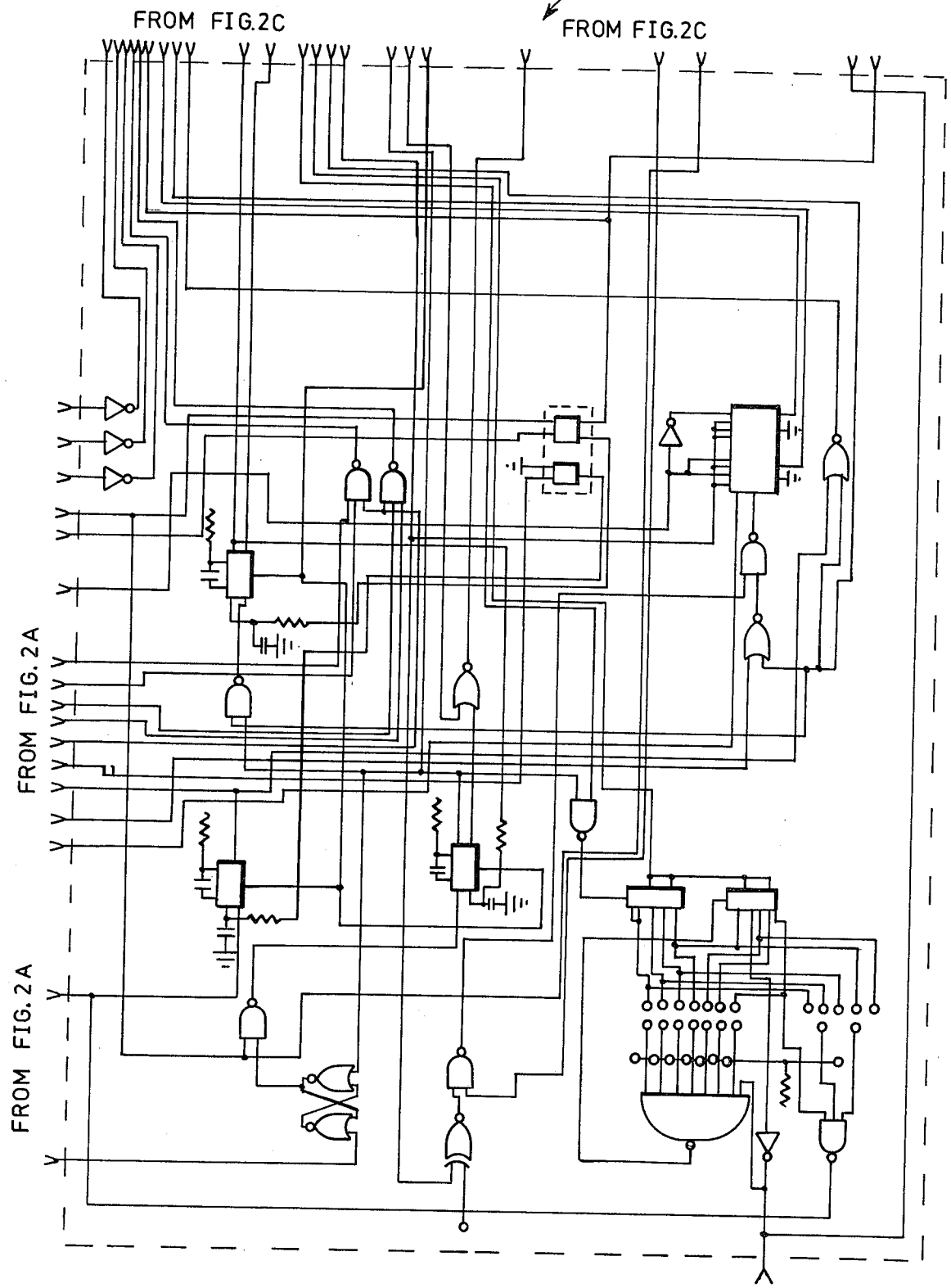
Fig.2B   KEYBOARD INTERLOCK 18

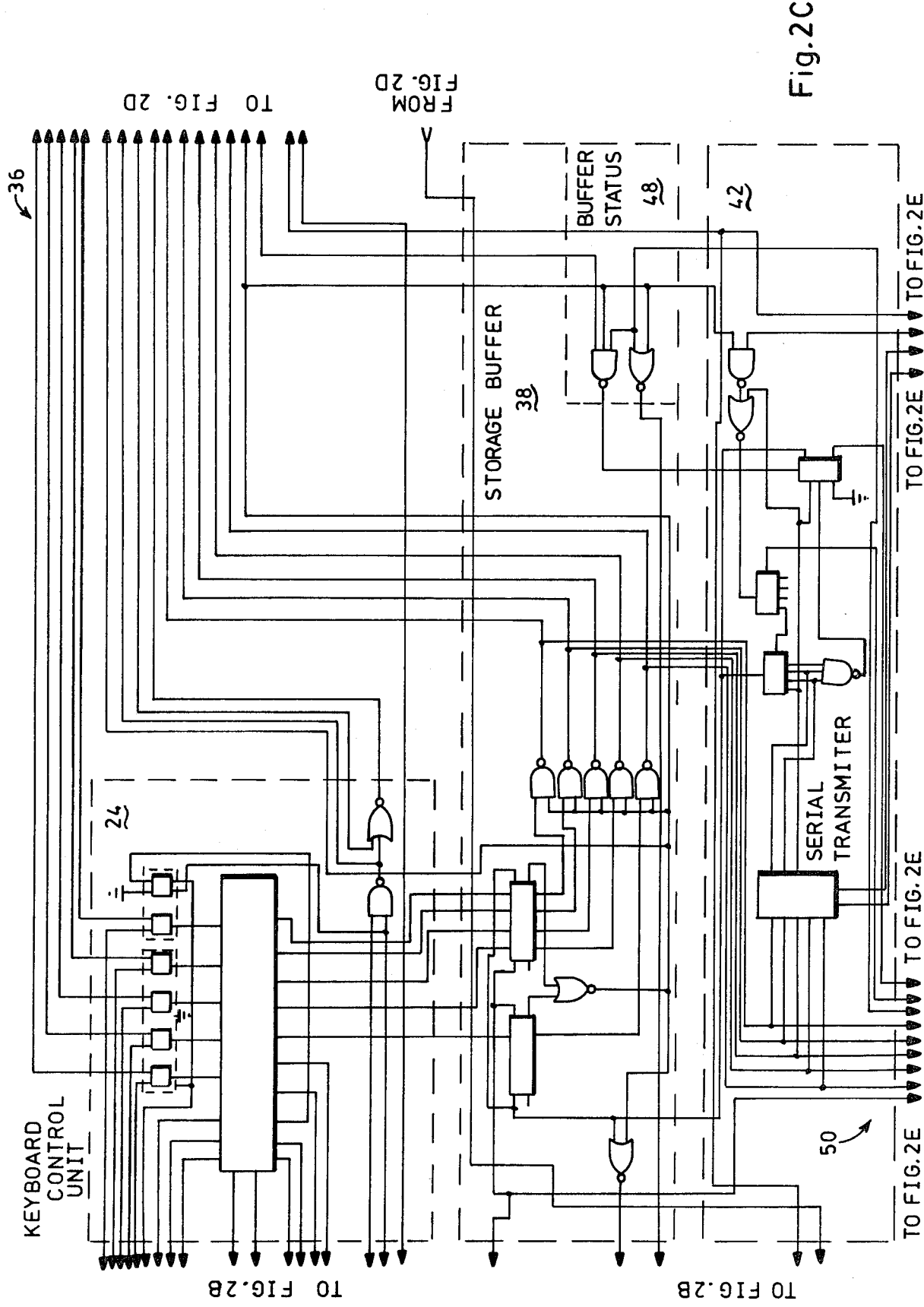

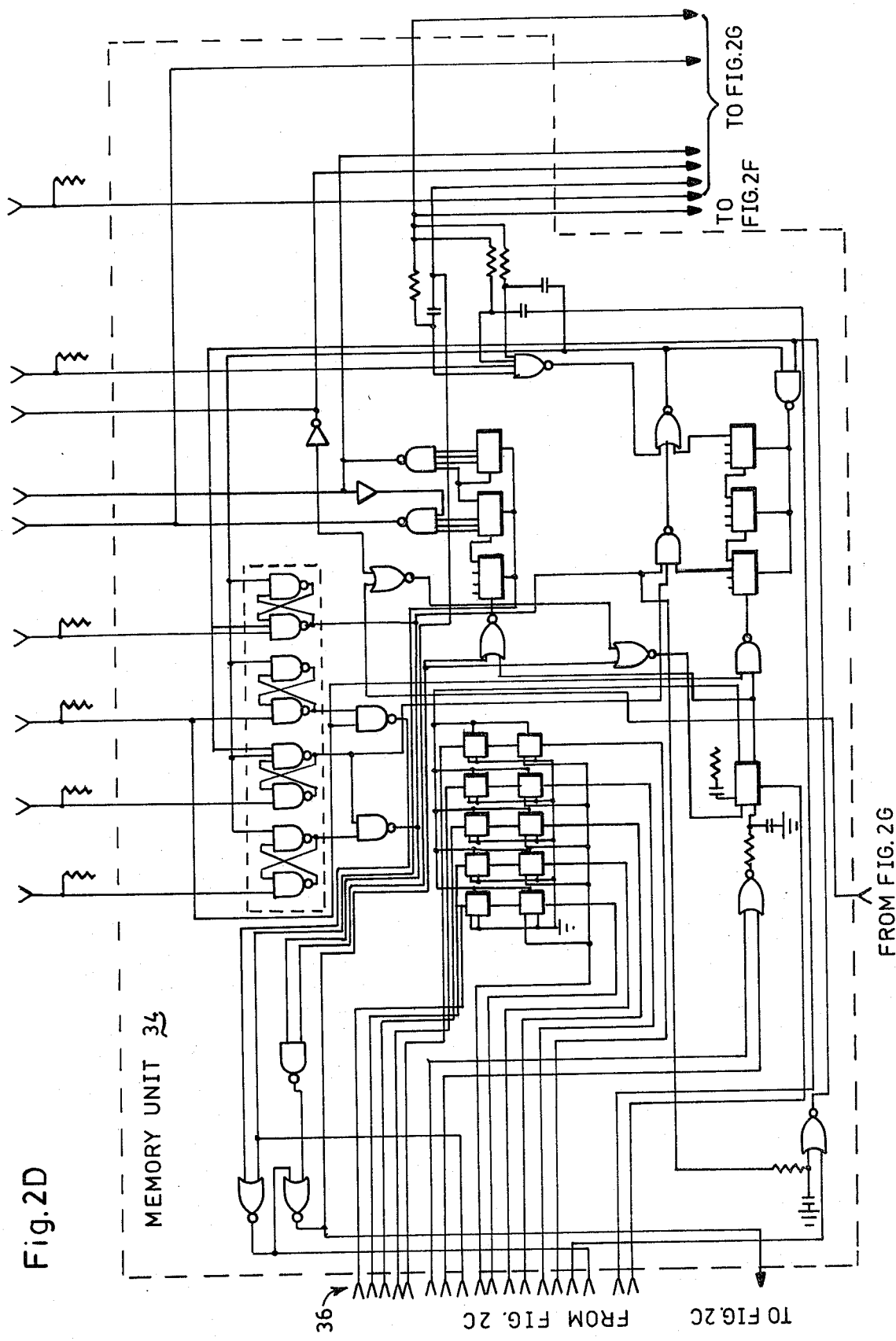

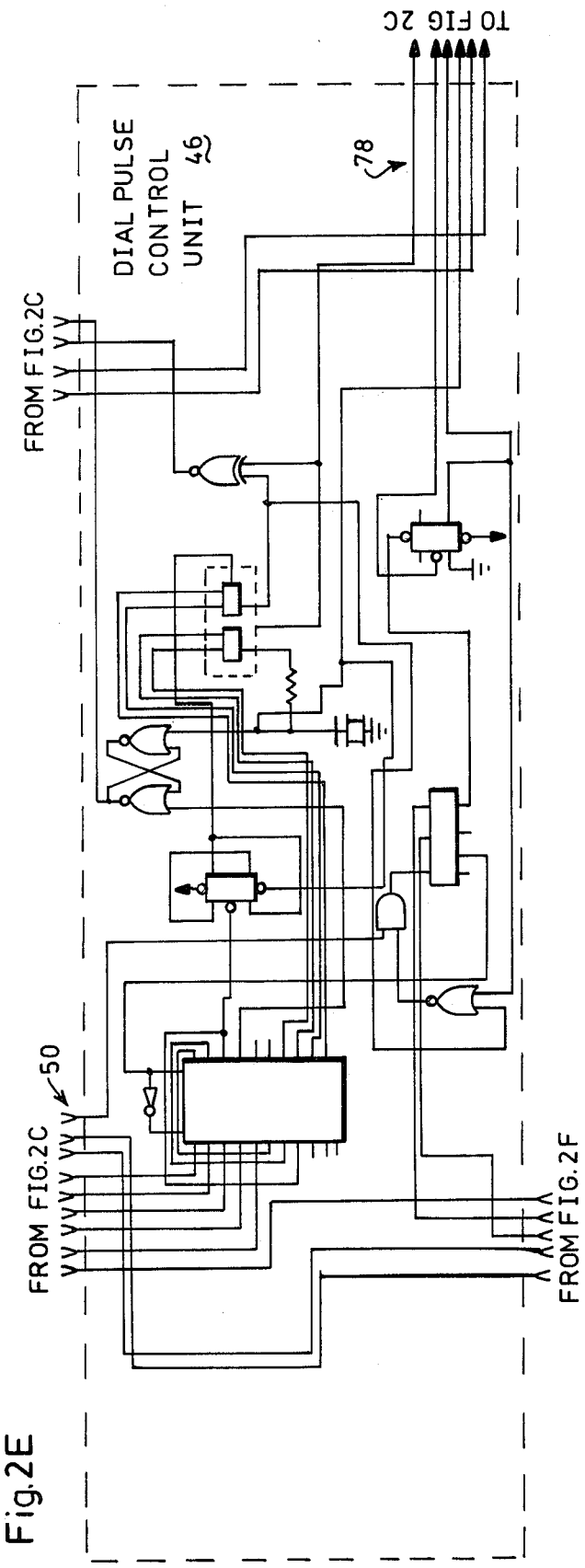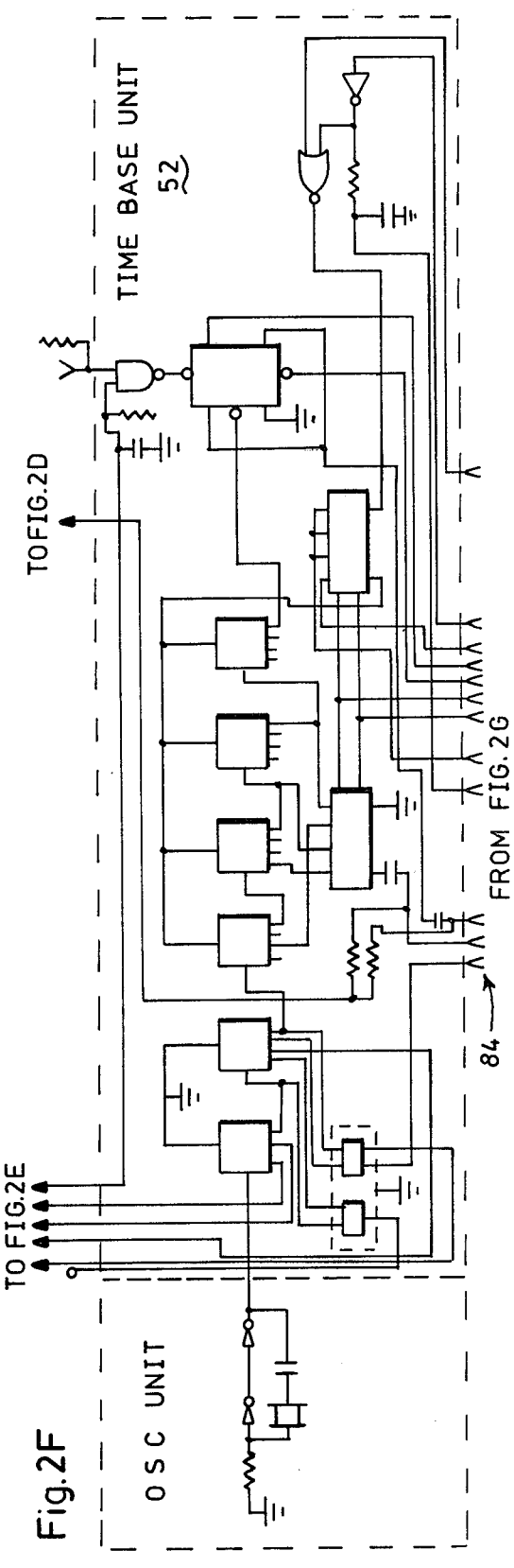

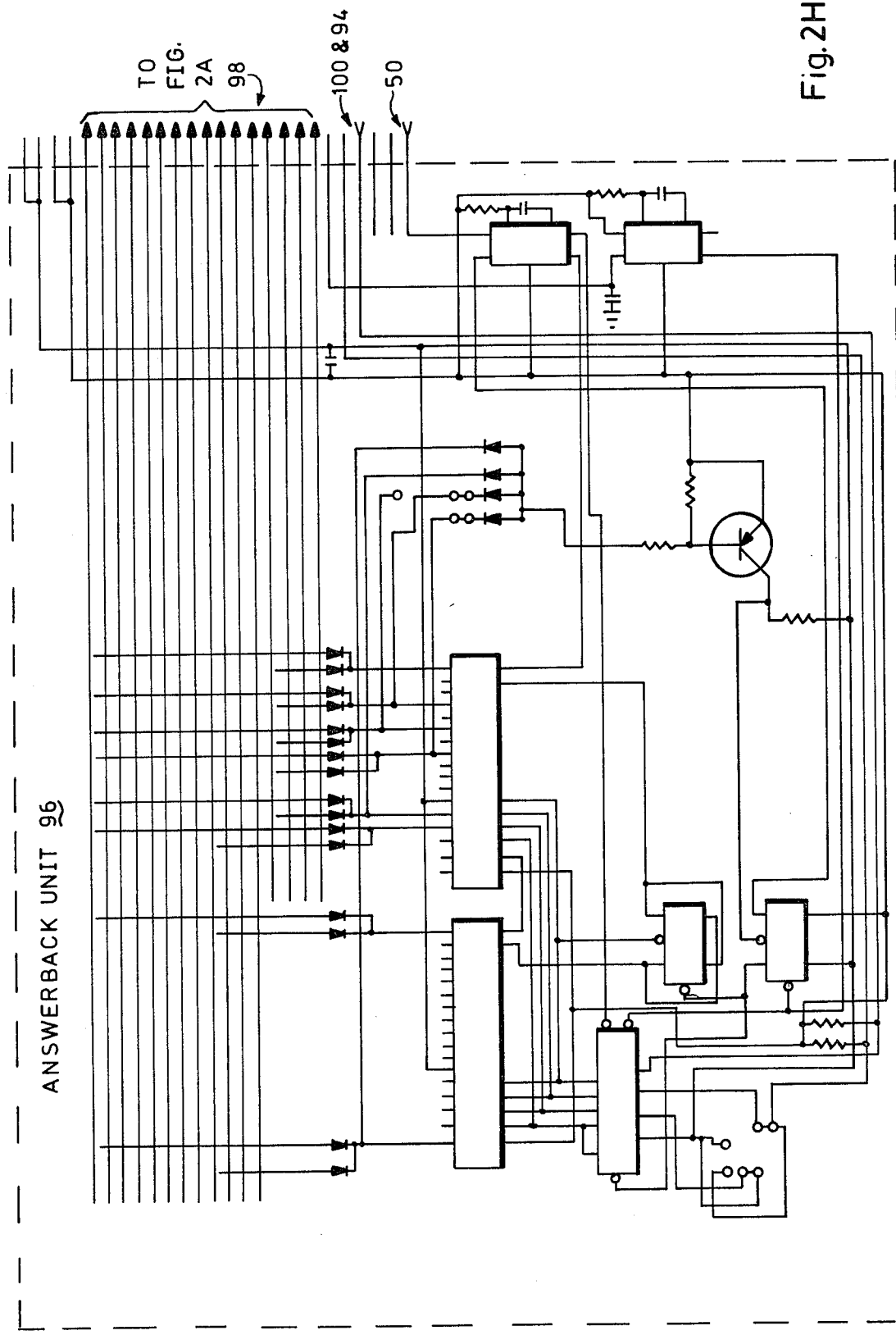

AUTOMATIC TELETYPEWRITER

CROSS REFERENCE TO RELATED APPLICATION

This application is a continuation of U.S. Application Ser. No. 895,066 filed Apr. 10, 1978 which was a continuation of U.S. Application Ser. No. 639,691 filed Dec. 11, 1975, both of which have become abandoned.

BACKGROUND OF THE INVENTION

The present invention relates to teletypewriters and more particularly to an automatic teletypewriter compatible with the telegraph exchanges commonly known as a telex system.

The conventional telex terminal has elements resembling a cross between a telephone and typewriter. That is, the device comprises a housing having an alphanumeric keyboard and provided with a telephone-type rotary dial. The machine operator dials the number she wishes to connect with utilizing the dial and, after connection is made, transmits a message. This is done most frequently by means of a perforated paper tape and transmitter.

The principal object of the present invention is to provide an improved automatic teletypewriter wherein the operator carries out all functions, including dialing through the keyboard and electronic storage.

A further object is to automate certain of the mechanical functions which must now be performed by the operator, such as shifting between the alpha and numeric fields, to simplify the task of the operator. This includes means for comparing the field being printed with the field being sent to avoid alpha/numeric error.

SUMMARY OF THE INVENTION

The above and other beneficial objects and advantages are attained in accordance with the present invention by providing a teletypewriter including a keyboard having alpha and numeric characters and including means to utilize the numeric character keys for dialing into the telex network. The teletypewriter also automatically keeps count of the characters generated on each line and generates a carriage return-line feed signal at the end of each line if not directed to do so.

BRIEF DESCRIPTION OF THE DRAWINGS

In the accompanying drawings:

FIG. 2 including FIGS. 2a-2h are detailed schematic drawings of the various blocks of FIG. 1; and, FIG. 3 is a plan view of a circuit card for the answer back unit of the teletypewriter.

DESCRIPTION OF THE PREFERRED EMBODIMENT

In the following description of the preferred embodiment of the invention, reference will only be made to FIG. 1. The details of the specific circuits utilized to attain the functions set forth in the blocks of FIG. 1 should be apparent to one skilled in the art from a description of the functions. This is particularly true in light of the rapid advances being made in integrated circuit chips. The schematic drawings of FIG. 2 are thus presented merely as representative of a single embodiment of the circuit elements.

Figure 1:
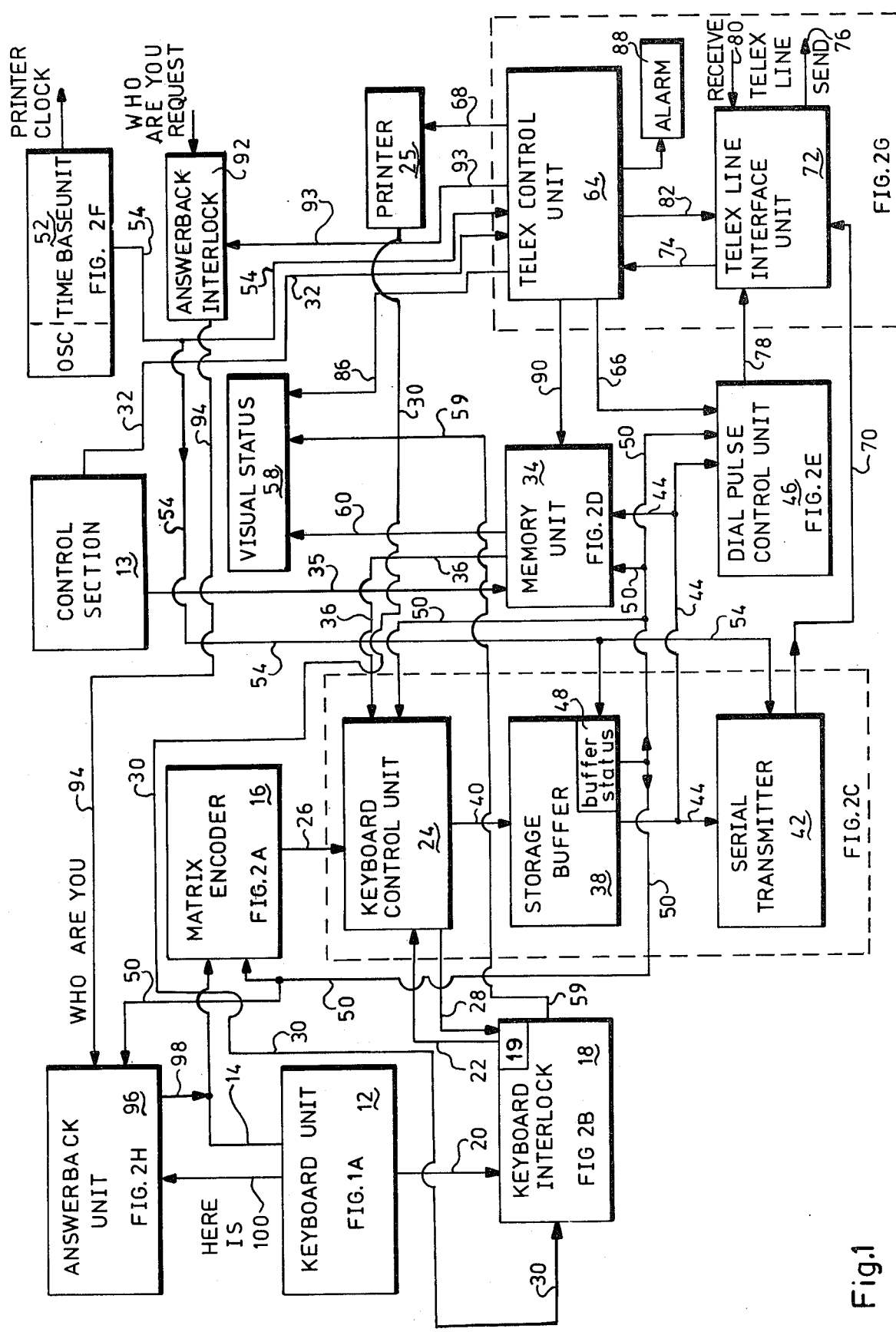
FIG. 1 is a block diagram of the teletypewriter of the present invention.

Reference is now made to the drawings and in particular to FIG. 1 wherein the teleprinter is illustrated in block diagram form.

THE KEYBOARD 12

Figure 1A:
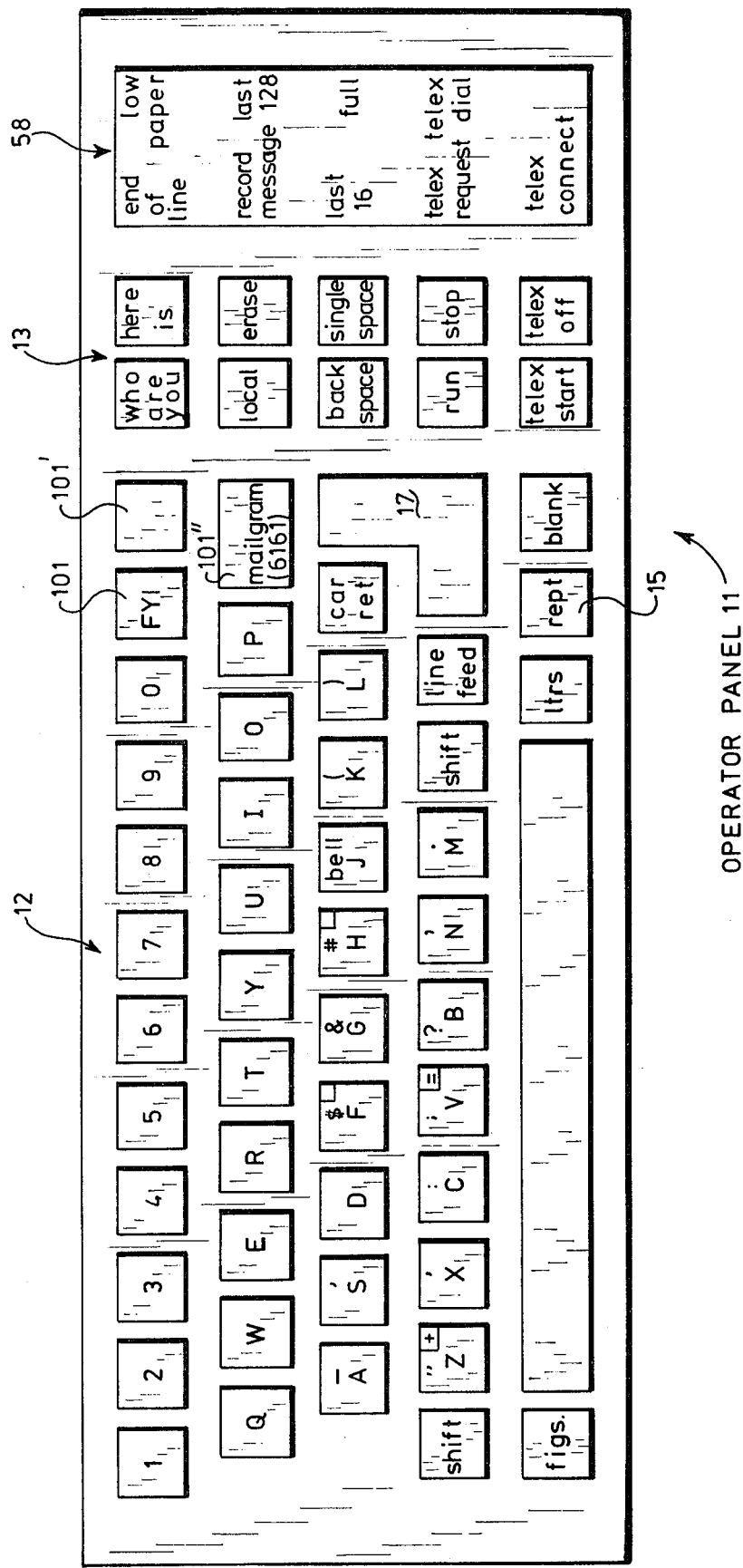
FIG. 1A is a top plan view of the operator's panel of the teletypewriter.

The device includes an operating panel 11 (FIG. 1A) which is similar in many respects to a conventional teletypewriter keyboard but differs in certain respects which will be discussed forthwith. One principal distinction is the absence of a dialer, similar to a telephone dialer, which is a standard fixture on conventional telex equipment. The operator's panel 11 includes a keyboard 12, a control section 13 and a visual status-indicator 58. The keyboard 12 includes an alpha field including punctuation keys, a numeric field and function keys (i.e., shift, repeat, carriage return, line advance, etc.).

Figure 1B:
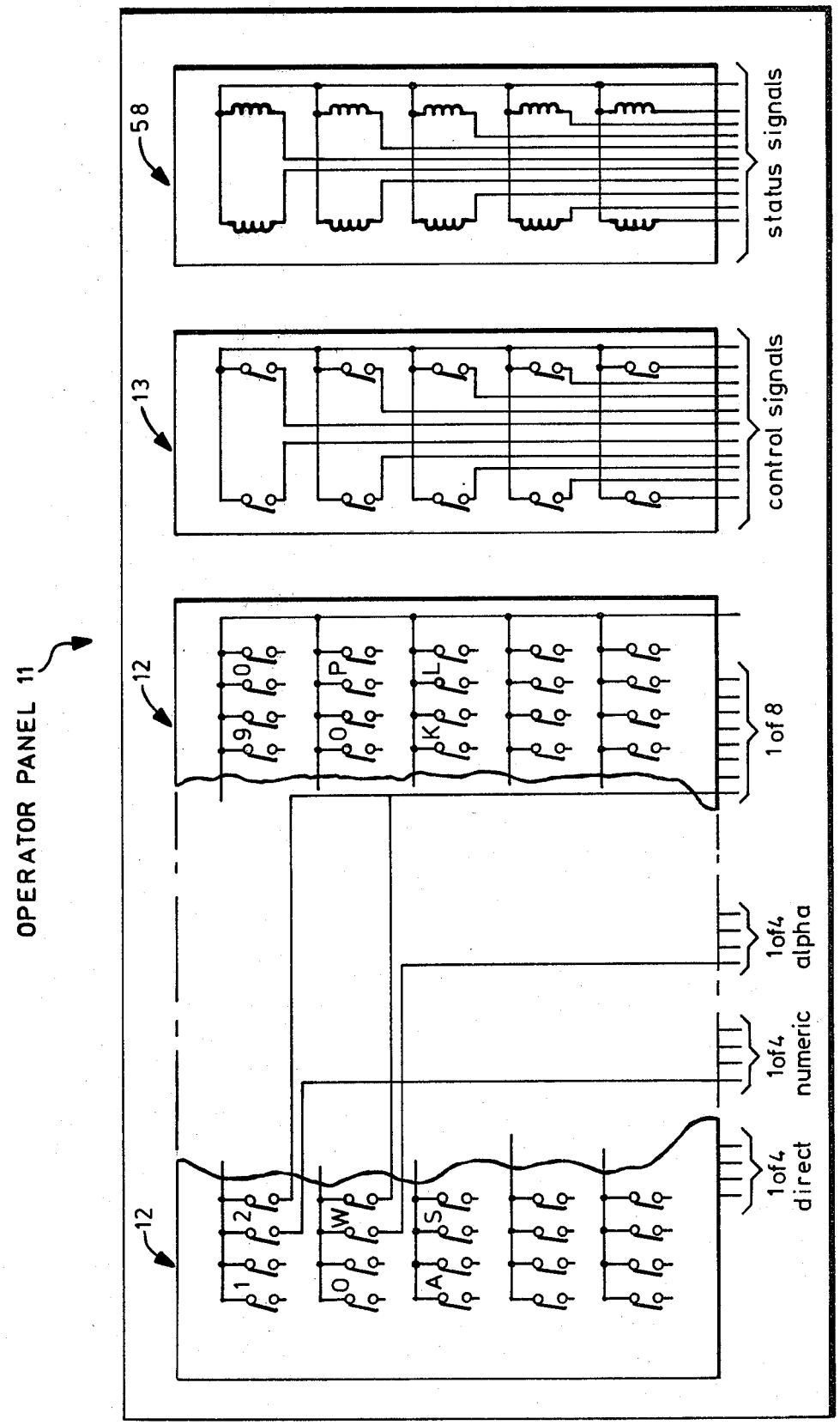
FIG. 1B is a schematic representation of the operator's panel shown in FIG. 1A.
Figure 2A:
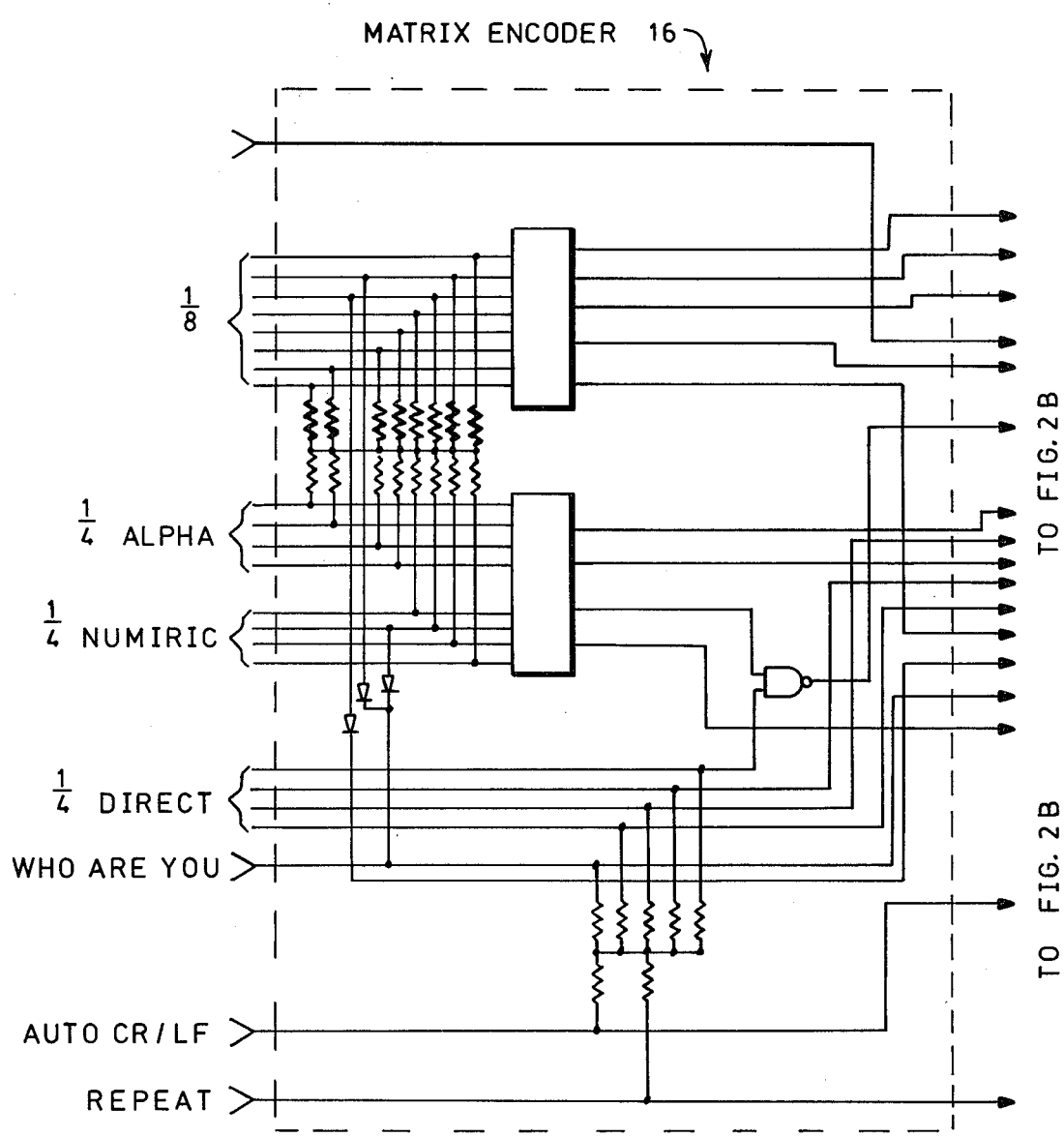
Figure 2G:
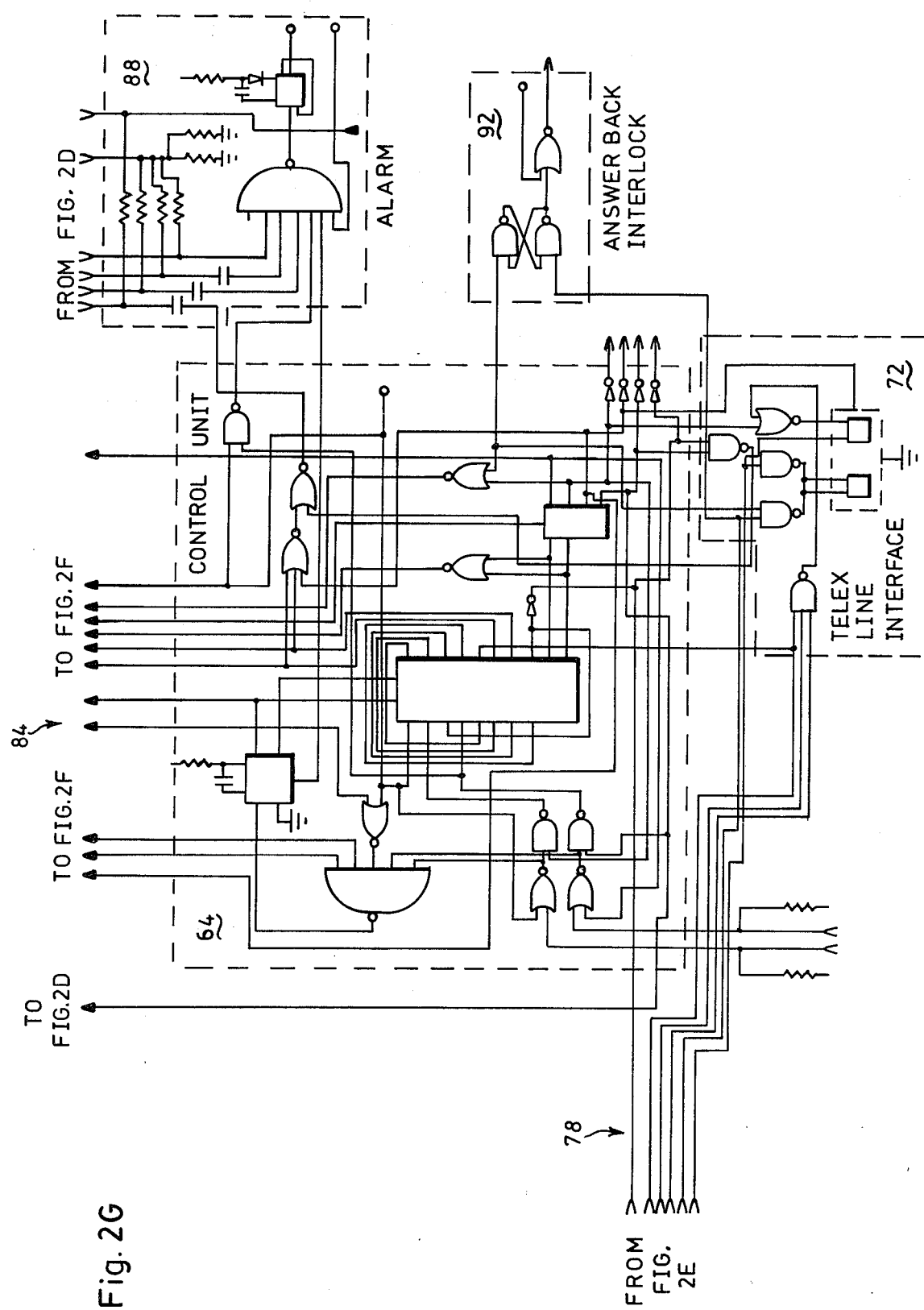

In accordance with conventional practice, data transmitted by the presently known teletypewriter must be in Baudot code wherein each character is represented by five, equal length bits. Accordingly, the keyboard 12 in the embodiment shown herein is designed to generate the necessary Baudot coding as shown in FIG. 1B and FIG. 2A. To this end, each keyswitch has two wires leading from it. The first wire is connected to one of eight buses defining the first three bits of the Baudot code. The second wire is connected to one of four buses defining the fourth and fifth data bits. Three groupings of the latter four buses are provided; the first for the alpha field, the second for the numeric field, and the third for the function keys which must function in both the other cases. A shift key when depressed shifts the keyboard from the alpha to the punctuation case. Additional keys include a carriage return and line feed key, "who are you?" key, a repeat key 15 which permits the automatic repeat of the last character generated as will be discussed and an automatic carriage return and line feed key 17 which automatically generates a carriage return and line feed with a single key stroke. Other keys are provided on the control section 13 associated with the telex system and memory system of the present device as will be described. The one of eight buses and the one of four buses providing thereby an eight by four matrix providing the 32 characters required of the Baudot, five unit, code (i.e., $8 \times 4 = 2^5 = 32$). The buses, generally designated by the numeral 14 connect the keyboard 12 with a matrix encoder 16.

THE MATRIX ENCODER 16

The matrix encoder's primary function is to encode the signals from the keyboard unit 12 into Baudot code. In addition, signals from the answerback unit 96 and control section 13 are also encoded. The encoder also serves to insure the proper shifting of the printer by generating suitable command signals for transmission. In FIG. 2A there are three 1 of 4 (¼) inputs shown; one is indicated as alpha, one is indicated as numeric and the other is indicated as direct. If a numeric key "2" is pressed after an alpha key "W", before transmitting the data bits representative of the numeric key, the encoder will automatically generate a command to shift the printer from the alpha field to the numeric field and vice versa. To this end, the numeric data is stored temporarily in a temporary storage buffer (not shown) within the keyboard control 24 and recalled after the field shift signal is generated. If however a function key such as carriage key 19 is presssed—the signal arrives on the direct input and the character is generated directly.

Also shown in the matrix encoder drawing of FIG. 2A is a "who are you?", input which is used to generate a figure shift and a "D" which is the "who are you?" inquiry. The signal generated by automatic carriage return and line feed key 17 is directed into the keyboard interlock 18 to generate the character line feed sequence. This particular system is useful as an answerback system. In the encoder character it requires only 2 dots; one for 1 of 8 code and one for the 1 of 4. It defines 32 character combinations. The 2 dot system exhibits less chance for error in the field than do known systems which require 5 coding dots—one coding dot for each bit. It is the function of the matrix encoder 16 to interpret these codes, generate the Baudot code signal and to generate control signals.

KEYBOARD INTERLOCK 18

The keyboard 12 is also connected to a keyboard interlock unit 18 through line 20. The keyboard interlock 18, in turn, is connected to the keyboard control unit 24 through line 22. The keyboard interlock contains logic capable of several functions including the logic required for automatic repeat. After the operator depresses a key, the associated character (whatever it is) may be repeated as often as desired as long as the "REPEAT" key is held depressed. To this end, the output of the matrix encoder 16 is fed to keyboard control unit 24 through line 26. An output of the keyboard control unit which includes a single stage latch is fed to the keyboard interlock 18 through line 28. The data is also fed to a "first in", "first out" storage buffer 38 through line 40. Thus, when the "REPEAT" key is depressed this data is continuously available to the storage buffer to provide the desired repeat capability.

The keyboard interlock 18 also obtains input from the printer along line 30 which is fed to the keyboard control unit 24 through line 22 and used to determine if a field shift is necessary. This information is used to insure that the printer 25 and keyboard 12 are in synchronization with each other.

The keyboard interlock 18 also records the number of characters generated (i.e., keys depressed) which cause horizontal spacing of the carriage by means of a simple character counter 19 which resets each time the carriage return is generated. The status of each line is indicated in a visual status unit 58 via line 59 so that the operator has indication of the maximum number of additional characters which can be generated on that line without overprint at the end of the line. In the event the predetermined count is reached, the keyboard interlock 18 automatically initiates the generation of the carriage return and line feed signals so that overprinting cannot occur. The keyboard interlock 18 also insures that when the automatic carriage return and line feed key 17 is operated, the proper sequence (i.e., carriage return followed by line feed) is followed. The automatic carriage return and line feed signal is generated in microseconds so as to obviate any interference with the depression of the keys by the operator.

KEYBOARD CONTROL UNIT 24

As previously mentioned, the keyboard control unit 24 stores the field status; compares each new data from encoder 16 along line 26 with the existing field to determine if a field shift is necessary and if so, generates the field shift; generates the carriage return/line feed sequence; decodes the spacing characters for the character counter; and, provides the data latch for the repeat function. It also receives stored data from memory unit 34 along line 36 as well as additional inputs which will be described further in the system.

STORAGE BUFFER 38

The output of the keyboard control unit 24 is fed to storage buffer 38 through line 40. The storage buffer is a "first in", "first out" memory device which accepts information from the keyboard control unit 24 and presents the information to a parallel to serial transmitter 42 through line 44. The principal function of this device is to buffer the time difference between the speed at which information is generated (which could be in the order of microseconds in the case of the automatic carriage return signal) and the speed at which the information can be transmitted which is typically at a rate of 150 milliseconds/character. The output of the storage buffer 38 can also be presented to dial pulse control unit 46 and the memory unit 34 as required.

The status of the storage buffer 38 is sensed by a buffer status unit 48 synchronizing the various components through line 50 which connects with the matrix encoder 16, keyboard control 24, memory unit 34, dial pulse control unit 46 and answerback unit 96. The buffer status unit 48, in turn, is synchronized with the time base unit 52 through line 54 which also synchronizes the serial transmitter 42.

MEMORY UNIT 34

The memory unit 34 takes the output of the storage buffer 38 on line 44 and provides storage and feeds it into the keyboard control unit 24 through line 36. The keyboard control unit 24 selects data from the matrix encoder 16 or from the memory unit 34 through line 36 as required by system controls.

The memory unit 34 is designed to skip over blank characters at a very high rate, and in the event a predetermined number of blanks is detected, automatically stops transmission to separate messages in the memory without adding redundant control characters. In addition, through line 35, the memory works in conjuction with the control section 13 keys "local", "erase", "backspace", "single space", "run", and "stop" for providing the desired operator functions. The keyboard can enter data into the memory only in the "local" mode of operation.

The visual status unit 58 is connected to the memory through line 60 to give indication of the number of stored characters or more importantly, the number of additional characters that can be stored before an overflow situation is reached. When the memory is full no additional characters can be stored until that data is transmitted.

DIAL PULSE CONTROL UNIT 46

As previously mentioned, an important aspect of the present device is that the dialing function is performed through the numeric keys of the keyboard unit 12, or from the memory unit 34 rather than through a separate dialer. To effect this, a dial pulse control unit 46 is provided. As shown, this unit receives data from the storage buffer 38 through line 44. This information is in Baudot code and the dial pulse control unit 46 must convert this code into dial signals, that is, a train of pulses compatible with the pulses generated by the conventional rotary dial of the telephone and telex networks.

Upon receiving a signal from the telex control unit 64 along line 66 that the system is in condition for dialing, the dial pulse control unit 46 accepts parallel data from the storage buffer 38 along line 44 and provides telex network compatible pulses corresponding to the characters selected from the keyboard, if such characters are numbers. Thus, assuming the telex control unit 64 has indicated a dialing period, when a numeric key is depressed, the dial pulse control unit 46 will provide an idle time of 600 milliseconds which is the interdigit dial time, and then generates as many 60 millisecond pulse and 40 millisecond idle time combinations as required for each numeric digit (e.g., if the digits 2-1 are to be dialed, the dial pulse control unit will generate 600 60/40 60/40 600 60/40). These signals are transmitted to telex line interface unit 72 on line 78 for transmission on outgoing line 76. The digit that was converted to 60/40 pulses is also printed through a signal to the printer 25 appearing on lead 68 (via the serial transmitter 42, line 70, telex interface unit 72, line 74 and telex control unit 64).

In the event a character is not one of the ten dialing characters (i.e., numerics) the dial pulse control unit 46 provides the logic to only print the character but the character is not converted to dialing code and stops the memory unit.

TELEX LINE INTERFACE 72

The telex line interface unit 72 serves to protect both the external telex lines 76 and 80 and the present equipment from incompatible signals. Thus, the unit accepts signals over lines 70 and 78 respectively from the serial transmitter 42 and dial pulse control unit 46 and routes them over the telex line 76 at proper signal levels and, via line 74 to the telex control unit 64.

Similarly, messages received from the telex network (over line 80) are routed (at proper signal levels) to the printer 25 over line 68 from the telex control unit 64.

TELEX CONTROL UNIT 64

An important function of the telex control unit 64 is to provide the controls necessary via line 32 to permit the teletypewriter disclosed herein to operate with the existing telex network. Thus, to send a message, the telex control unit 64, via line 82 and the telex interface unit 72 puts out a "request-to-send" on line 76. The exchange responds if the equipment is available, with a "proceed-to-dial" signal on the receive line 80 which the telex control unit 64 interprets. If the equipment is not available, the unit is shut down by the telex control unit 64 and the operator must try again at a later time. During the "proceed-to-dial" time period the only signals that can be sent out on line 76 are dial signals. After the desired terminal is dialed, the exchange generates a "telex connect" or "busy" signals on receive line 80 which are interpreted by the telex control unit 64 which then either provides a visual indicator signal to the operator via visual status unit 58 to begin transmission or shuts down the unit.

If the operator is in the process of entering data into the memory while the unit is in a "local mode" and an incoming transmission is detected on line 80, the telex control unit 64 activates an audible alarm 88 for a short time period and thereafter automatically shifts the unit to receive the incoming call.

ANSWERBACK UNIT 96

It is conventional that after a telex connection is made, but prior to the transmission of data, a request for identification of the receiving party is made. By international convention, this "who are you?" signal comprises the "D" key shifted to the upper case. When the "who are you?" message is received, the terminal responds with an "answer back" signal which identifies the receiving party.

In the subject teletypewriter, wherein everything that is transmitted is also printed, an answerback interlock 92 is provided to preclude the possibility of the unit answering its own "who are you?" request. Thus, if a "who are you?" request comes in, it is fed to the answerback interlock 92 which also receives an input 93 from the telex control unit 64 as to whether or not the "who are you?" was internally generated. If "yes", the request is ignored. If "no", the interlock feeds the request via line 94 to answerback unit 96 which is programmed to generate the appropriate "here is" signal and feed it via lead 98 to the matrix encoder 16 to automatically respond to the request. The "here is" signal may also be triggered by the operator by depressing an appropriate "here is" key on the control section 13 to generate a signal on line 100 which generates the automatic identification signals as if a "who are you?" signal was generated.

The answerback unit 96 also has capability to store frequently used numbers which can be recalled by the operator depressing one of three keys, 101, 101 or 101 on the keyboard 12. Additional keys can be added as desired. The numbers are fed via line 98 to the matrix encoder 16 and thereafter fed to the dial pulse control unit 46 in the manner previously described.

A third method of dialing is to enter the number to be dialed into the memory unit 34 when the unit is in the "local" mode. During the "proceed-to-dial" time period the number to be dialed would be fed to the dial pulse control unit 46 (via the keyboard control 24 and the storage buffer 38). Thereafter, when the connection is made, the message stored in the memory will be transmitted as previously described.

Figure 3:
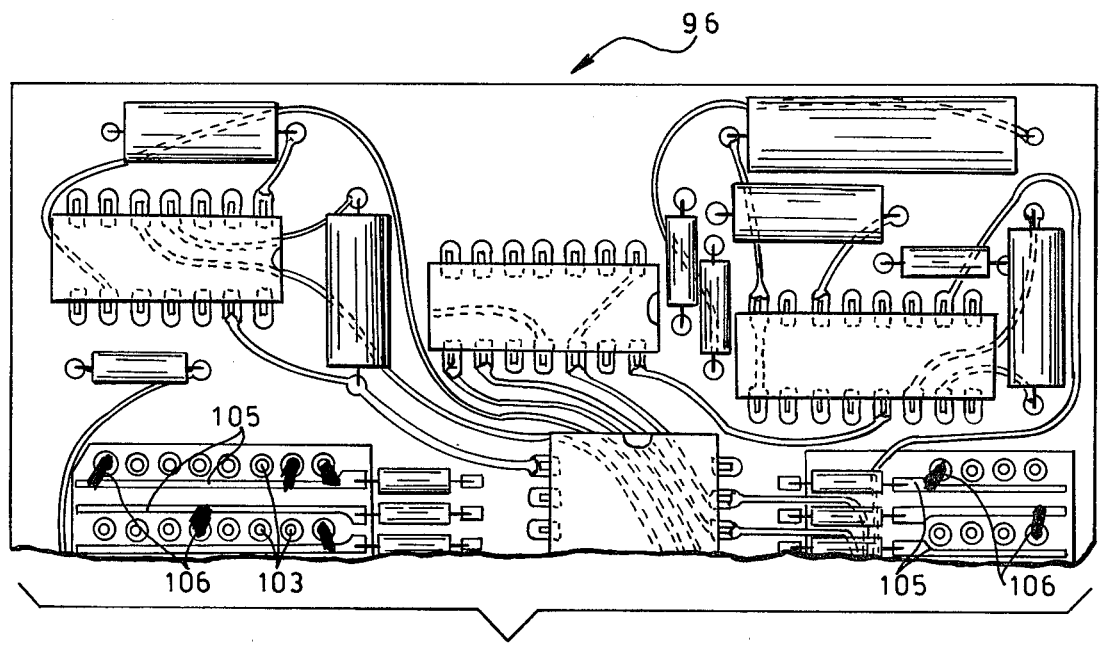
Figure 3:
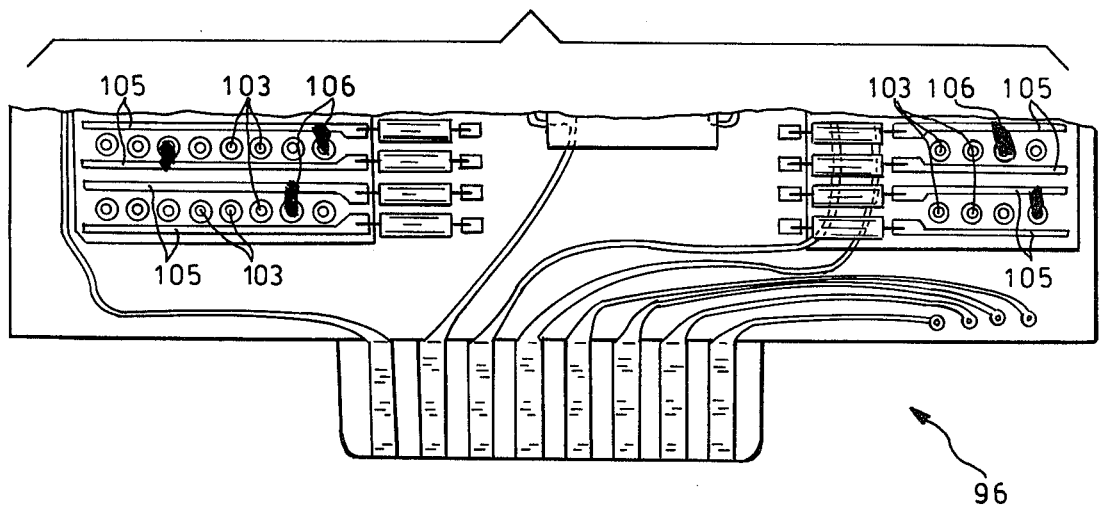

The answerback unit 96 may conveniently be in the form of a circuit card as shown in FIG. 3. The card is so designed so that by making appropriate connections, which can readily be done in the field, such as with a conductive ink, the one of eight and one of four inputs to the matrix encoder 16 can be made. Accordingly, the one of eight matrix appears on the left side of the card shown in FIG. 3 in the form of a series of vertical columns of dots 103 and the one of four matrix appears on the right side of the card. A series of horizontal bars 105 is provided to separate the dots. The bars are sequentially scanned to generate the answerback or dialing number sequence. Connections 106 between the dots 103 and bars 105 are made with the conductive ink to provide a matrix input to the encoder as described previously in connection with the keyboard. Thus, by removing any particular connection 106 with a suitable solvent, the card can readily be reprogrammed. The dial pulse control unit 46 senses a non-numeric character, as previously described, at the end of the dialed numbers and interprets it as such and stops the memory.

Having thus described the invention, what is claimed is:

1. A teletypewriter comprising: a keyboard having a plurality of alpha and numeric character keys; means interconnecting each of said keys with an encoder; said encoder adapted to generate said characters in parallel Baudot code; storage buffer means connected to said encoder; a line interface unit connected to a network send line; a dial pulse control unit interposed between said line interface unit and said storage buffer means for converting numeric characters in parallel Baudot code to rotary dial pulses whereby dialing into the network can be effected through the numeric characters of said keyboard, a serial transmiter interposed between said line interface unit and said storage buffer means for receiving characters in parallel Baudot code and converting to serial code; and control unit means receiving information signals from said line interface unit and selectively actuating said dial pulse control unit.

2. The teletypewriter in accordance with claim 1 further comprising a printer connected to said control unit whereby all characters to be transmitted are also printed.

3. The teletypewriter in accordance with claim 1 further comprising a keyboard interlock connected to said keyboard and said encoder, said keyboard including a carriage return key, said keyboard interlock including counter means to maintain count of the number of characters generated between carriage return signals and means to generate a carriage return signal automatically in the event the number of characters following the last carriage return signal exceeds a predetermined limit.

4. The teletypewriter in accordance with claim 1 wherein each key has a first lead extending to a first group of one of eight bus bars and a second lead extending to a second group of one of four bus bars.

5. The teletypewriter in accordance with claim 4 further comprising an answerback unit adapted to automatically generate an identifying signal to said encoder in response to a signal request for such identification.

6. The teletypewriter in accordance with claim 5 further comprising a printer connected to said control unit and an interlock unit operative to inhibit said answerback unit interposed between said answerback unit and said printer, means interconnecting said interlock and said control, said control interconnecting said interlock when said identification request is internally generated.

7. The teletypewriter in accordance with claim 5 wherein said answerback unit comprises a circuit board having a first plurality of conductive dots arranged in a one of eight matrix, a second plurality of conductive dots arranged in a one of four matrix, a first plurality of horizontal sequence bars arranged adjacent said first plurality of dots and a second plurality of horizontal sequence bars arranged adjacent said second plurality of dots whereby said card may be programmed in the field by making interconnection between said dots and bars.

8. The teletypewriter in accordance with claim 7 wherein said interconnections are made with a removable conductive ink whereby said connections can be removed with solvent and said card reprogrammed.

9. The teletypewriter in accordance with claim 2 further comprising a keyboard interlock unit connected to said keyboard and adapted to receive a field status input from said printer and to generate a field shift signal to said keyboard in the event the field of said keyboard differs from the field of said printer.

* * * * *